United States Patent
Wydra et al.

[11] Patent Number: 5,853,575
[45] Date of Patent: Dec. 29, 1998

[54] REMOTE MOUNT FUEL FILTER KIT WITH PRIME MAINTAINING CHECK VALVE

[75] Inventors: William W. Wydra, Ashland; Mark D. Mensch, Catawissa, both of Pa.

[73] Assignee: Ashland Technologies, Inc., Ashland, Pa.

[21] Appl. No.: 749,212

[22] Filed: Nov. 14, 1996

[51] Int. Cl.$^6$ .................................................. B01D 35/02
[52] U.S. Cl. .......................... 210/136; 210/232; 210/249; 210/444
[58] Field of Search ..................... 210/136, 168, 210/249, 232, 416.4, 416.5, 444, 117, 440; 123/196 A; 137/454.2, 454.4, 541, 549; 285/314–316; 248/98, 675, 200

[56] References Cited

U.S. PATENT DOCUMENTS

| | | | |
|---|---|---|---|
| 2,006,833 | 7/1935 | Jenson | 285/314 |
| 2,110,124 | 3/1938 | Fitzgerald . | |
| 2,249,071 | 7/1941 | White | 210/249 |
| 2,576,144 | 11/1951 | Rood | 210/249 |
| 3,167,507 | 1/1965 | Burhans et al. | 210/136 |
| 3,390,780 | 7/1968 | Bennett | 210/444 |
| 4,129,145 | 12/1978 | Wynn | 137/541 |
| 4,452,695 | 6/1984 | Schmidt . | |
| 4,492,632 | 1/1985 | Mattson | 210/416.5 |
| 4,512,884 | 4/1985 | Wheatley | 210/136 |
| 4,637,874 | 1/1987 | Anseth | 210/232 |
| 5,017,285 | 5/1991 | Janik et al. . | |
| 5,039,406 | 8/1991 | Whittington . | |
| 5,084,172 | 1/1992 | Yee | 210/444 |
| 5,244,571 | 9/1993 | Church et al. . | |
| 5,298,158 | 3/1994 | Anderson . | |
| 5,362,390 | 11/1994 | Widenhoefer et al. . | |
| 5,525,219 | 6/1996 | Okabe et al. . | |
| 5,611,923 | 3/1997 | Suri et al. | 210/136 |

Primary Examiner—Matthew O. Savage
Attorney, Agent, or Firm—Jones & Volentine, L.L.P.

[57] ABSTRACT

A remote fuel filter kit that maintains the prime on a fuel system while changing the engine fuel filter or when the engine is off. A filter adapter is installed on the engine in place of the original fuel filter. The adapter directs the fuel from the engine to a remote filter attached to a remote filter head, and from the remote filter back to the engine. The remote filter head can be mounted in any assessable location and will accept the original fuel filter. The remote filter head has at least one check valve located in the passage from the engine to the remote filter head. The check valve prevents air from being admitted into the fuel system when the fuel filter is changed or during engine-off situations. Fuel hoses, mounting brackets and installation hardware complete the remote fuel filter kit.

7 Claims, 9 Drawing Sheets

REMOTE MOUNT FUEL FILTER KIT WITH PRIME MAINTAINING CHECK VALVE

BACKGROUND OF THE INVENTION

1. Field of the Invention

The present invention generally relates to remotely mounted fuel filter assemblies for creating easier access to the filter assembly, and more particularly, to a remotely mounted fuel filter assembly that is easily installed and maintains the prime on the fuel system during filter changing and engine-off situations.

2. Description of the Prior Art

Water and abrasive particles in a fuel supply can damage engine components, such as the carburetor and fuel injection systems, or adversely affect the performance of the engine by compromising the ability of the fuel system to precisely meter the appropriate amount of fuel at the appropriate pressure.

Accordingly, fuel filters are incorporated in engine fuel systems to filter out water and abrasive particles from the fuel coming from the fuel tank before being introduced to the engine. As the fuel contaminants build up, the fuel filters must be periodically replaced to maintain their effectiveness. In some cases the fuel filter is easily assessable and may be replaced easily. In many cases, however, the fuel filter assembly is located in a hard to reach area on the engine, or is blocked by part of the vehicle chassis, drive train or other obstruction endemic to the particular vehicle.

Changing the fuel filter can become a time consuming and difficult job, to the extent that many people will forego the periodic replacement of the fuel filter to the detriment of engine life and engine performance.

Also, while changing the fuel filter, one must ensure that air is not admitted into the fuel system, otherwise the fuel system prime will be lost. Air in the fuel system can cause fuel drain-back, which results in hard starting or non-starting conditions.

In light of the foregoing, there exists a need for a remote mounted fuel filter kit to relocate the original engine mounted filter to a more assessable location, while maintaining the prime on the fuel system during filter changes and engine-off situations.

SUMMARY OF THE INVENTION

The present invention is directed to a remote mounted fuel filter assembly which substantially overcomes one or more of the problems due to the limitations and disadvantages of the related art.

The remote mounted fuel filter kit is designed to locate the original engine mounted fuel filter away from the engine in a more assessable location. In general, the filter kit contains a filter adapter that is installed on the engine in place of the original filter. The adapter directs the fuel from the engine to the remote filter head and from the remote filter head back to the engine. The remote filter head can be mounted in any assessable location and will accept the original equipment manufacturer (OEM) filter that was originally located on the engine.

Preferably, the remote filter head has at least one check valve located in the passage from the engine to the remote filter head. A second check valve may be installed in the passage from the remote filter head back to the engine. The one or more check valves prevent air from being admitted into the fuel system when the fuel filter is removed. Fuel hoses and mounting brackets, including the installation hardware, complete the remote fuel filter kit.

To achieve these and other advantages and in accordance with the purpose of the invention, as embodied and broadly described, the invention provides for a fuel filter assembly for remotely mounting a fuel filter of a fuel system for an internal combustion engine in a vehicle, comprising: a remote filter head mounting bracket affixed to an easily assessable location on the engine or vehicle; a remote filter head mounted to the mounting bracket, the fuel filter being removably attached to the remote filter head; a filter adapter installed on the engine at a location where the fuel filter was removed, the filter adapter directing fuel from the engine to the remote filter via the remote filter head, and from the remote filter back to the engine via the remote filter head, through a plurality of hoses connecting the remote filter head and the filter adapter; and at least one check valve in the remote filter head, the check valve being located in a passage from the engine to the remote filter head to prevent air from being admitted into the fuel system while changing the fuel filter or when the engine is off.

It is to be understood that both the foregoing general description and the following detailed description are exemplary and explanatory and are intended to provide further explanation of the invention as claimed.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention is directed to a remote mounted fuel filter assembly kit for making the engine fuel filter more assessable. The fuel filter kit has means for ensuring the prime is maintained on the fuel system during filter changing and engine-off situations. The fuel filter kit may be adapted for use on any engine and for use with any fuel. The principles of this invention may also be used with oil or other lubricant filters as well. For convenience, the following discussion is carried out with reference to a fuel filter assembly kit.

Figure 1:
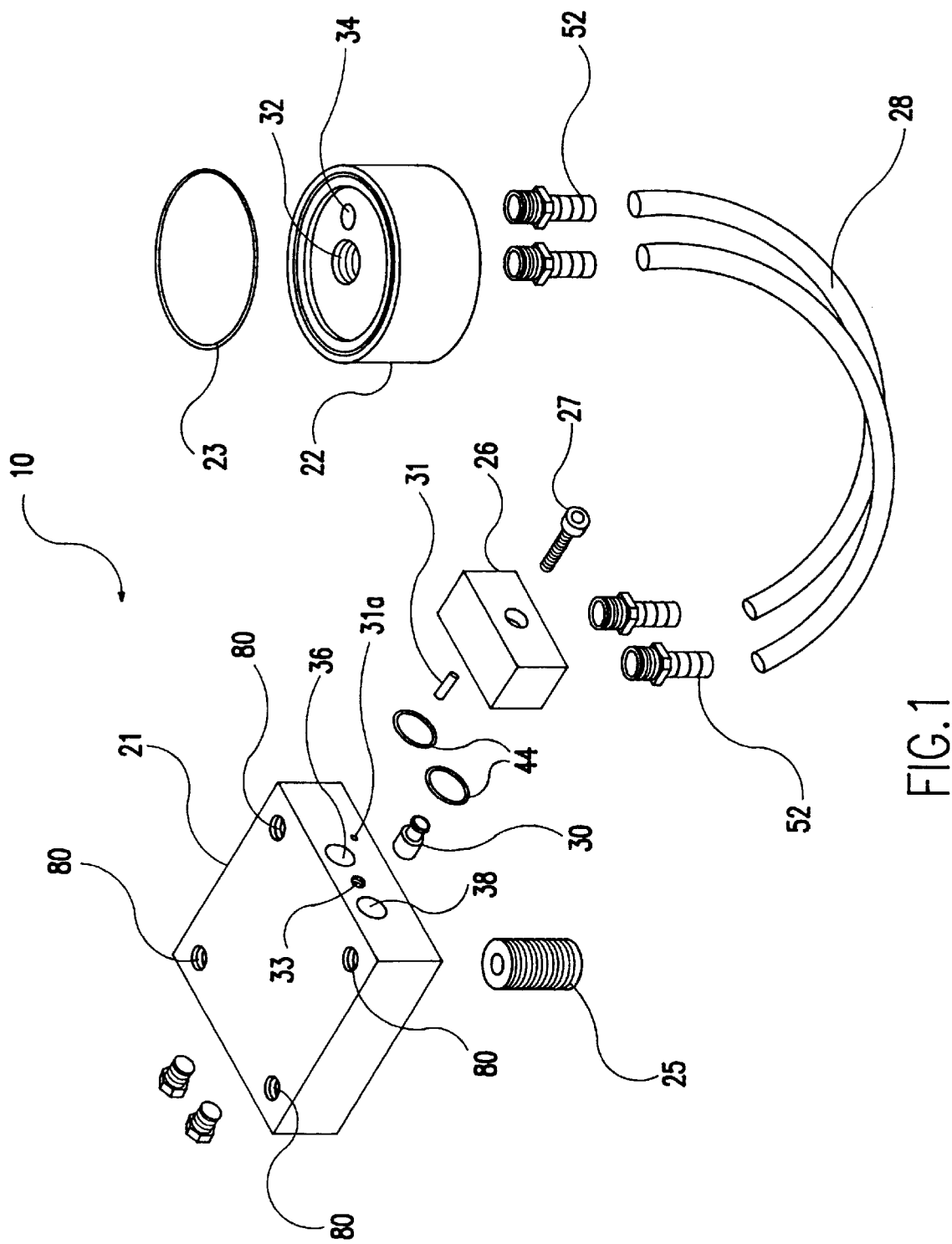
FIG. 1 is exploded perspective view of the remote mounted fuel filter assembly of the present invention.

Reference will be made to FIG. 1, which is an exploded perspective view of the remote fuel filter kit of the present invention. The main components of the fuel filter assembly 10 are a remote mount filter head 21, a filter adapter 22, fuel hoses 28, and check valve 30.

The filter adapter 22 is installed on the engine in place of the original filter, with O-ring 23 providing a typical sealing function between the filter adapter 22 and the engine. Recesses 32 and 34 enable the filter adapter to direct the fuel from the engine fuel system to the remote filter head 21 and from the remote filter head 21 back to the engine fuel system, through respective fuel hoses 28. The filter adapter may be machined from, for example, a solid billet of 6061 aluminum.

Figure 2:
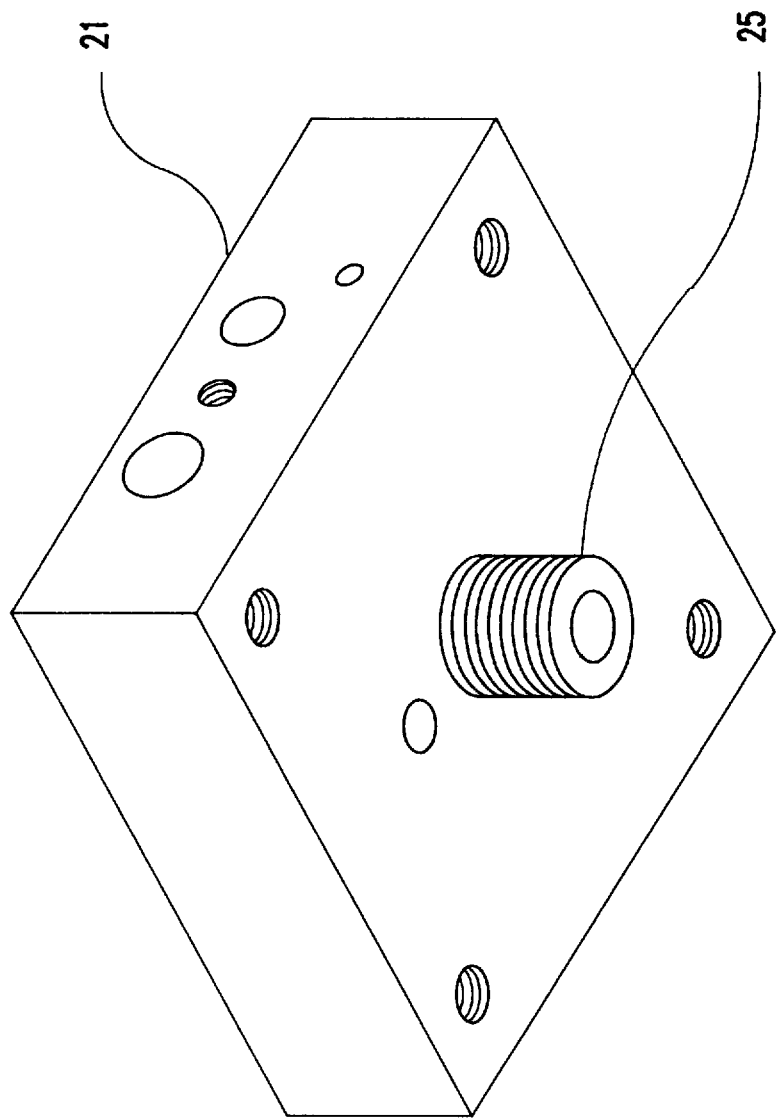
FIG. 2 is a bottom perspective view of the remote filter head assembly and stud filter mount of the present invention.

The remote mounted filter head 21 can be mounted in any assessable location of the engine compartment and will accept the original equipment manufacturer (OEM) filter that was originally located on the engine. Stud filter mount 25, for mounting the OEM filter, is more clearly shown in FIG. 2. Threaded adapters, for 16M×1.5 and 20M×1.5 filters, may be used with the stud filter mount 25 to accommodate any size fuel filter.

Figure 4:
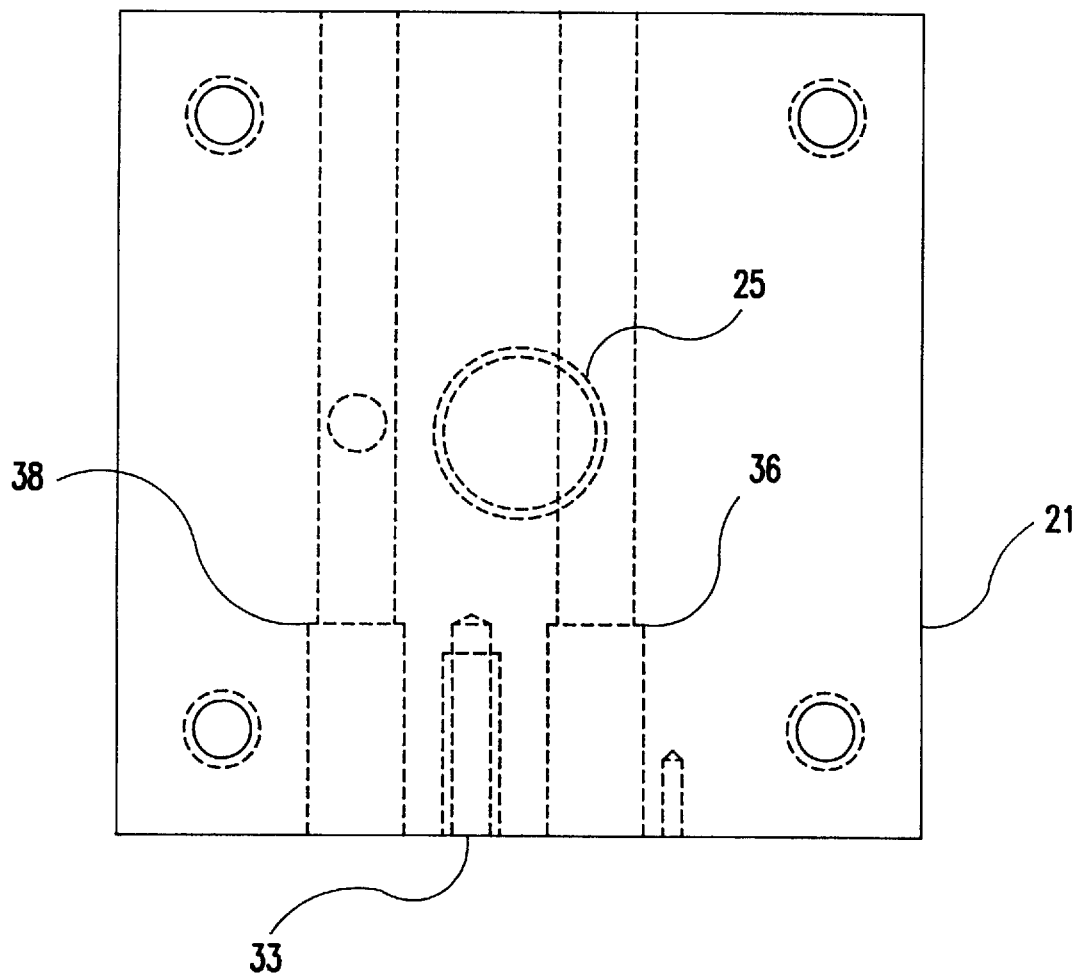
FIG. 4 is a top view of the remote filter head assembly.

The remote filter head 21 has at least one check valve 30 located in the filter head recess 38. The check valve 30 is located in the passage from the engine to the remote filter head 21. A second check valve may be installed in the recess 36 in the passage from the remote filter head 21 back to the engine. There is the possibility, however, that the second check valve will fail, causing debris or contaminants to enter the engine, thereby causing further damage. On the other hand, if the first check valve in recess 38 fails, the debris or contaminants will be captured in the fuel filter. Accordingly, while two check valves may be used in the practice of this invention, the preferred embodiment would be to use a single check valve in the passage from the engine to the remote filter head 21. The one or more check valves prevent air from being admitted into the fuel system when the fuel filter is changed or during engine-off situations. FIG. 4 is a top view of the filter head 21 showing the depth of the recesses 36 and 38, which would house the check valves 30.

Figure 3A:
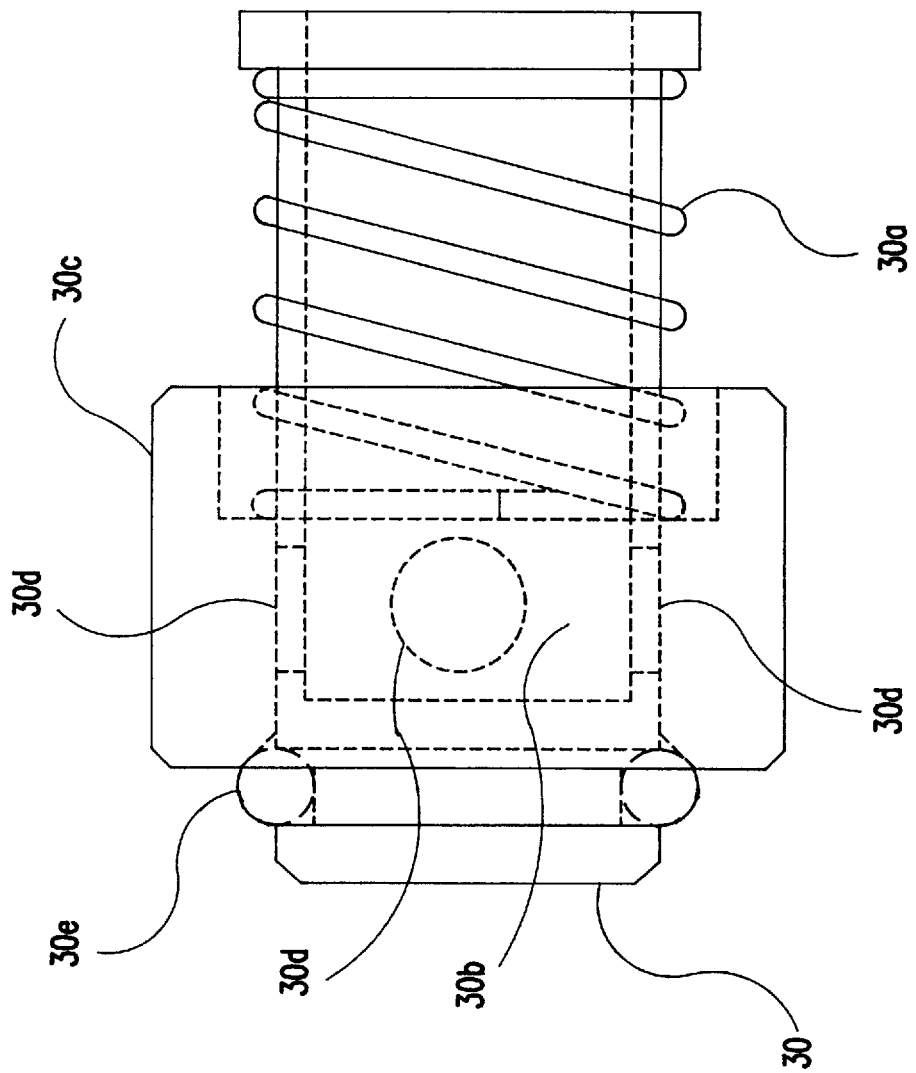
FIGS. 3A and 3B are side views of the check valve assembly of the present invention, showing closed and open positions respectively.
Figure 3B:
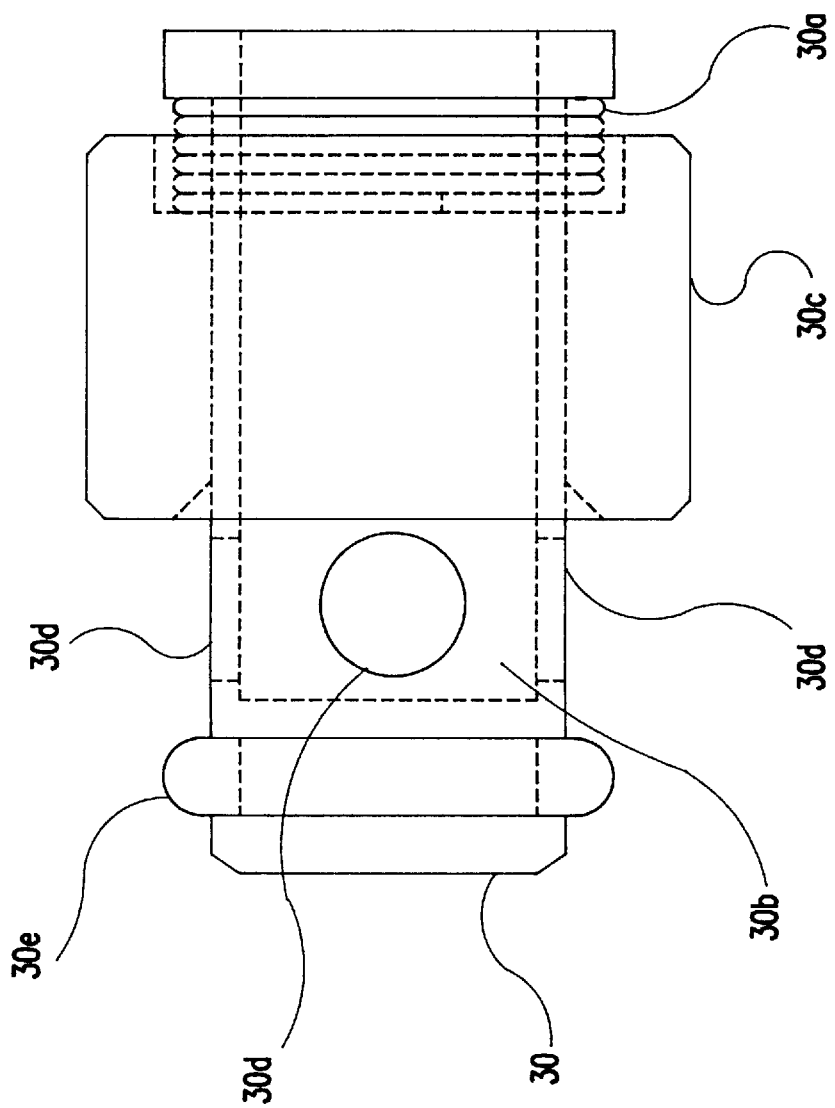
Figure 3C:
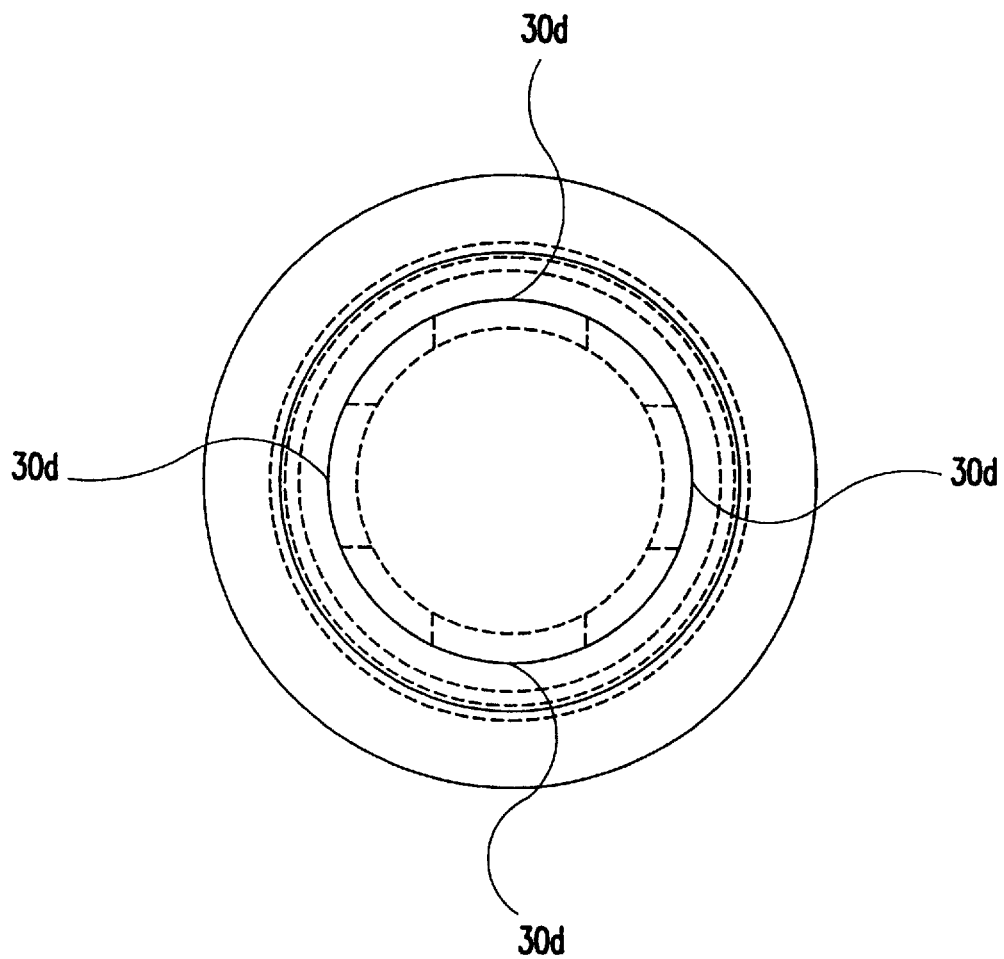
FIG. 3C is a front view of the check valve assembly.

FIGS. 3A–3C illustrate the check valves in greater detail. FIGS. 3A and 3B are side views of the check valve assembly of the present invention, showing closed and open positions, respectively, and FIG. 3C is a front view of the check valve assembly.

Each check valve has a spring portion 30*a* that communicates with a cup portion 30*c* and a plurality of ports 30*d* to maintain the prime air lock on the system while changing the filter or during engine-off situations, as well as allowing fuel to pass during engine operation.

The check valve is in the closed position (FIG. 1 and 3A) when the engine is off, whether due to changing the filter or simply when the vehicle is not in use. It can be seen that the spring 30*a* is extended and the plurality of ports 30*d* are surrounded by the cup portion 30*c* so that the fuel from the inner cylindrical portion 30*b* can not pass to the remote filter head 21. O-ring 30*e* maintains the seal on the check valve 30. With the check valve in the closed position, the prime on the fuel system is maintained by preventing air from being admitted into the fuel system.

As shown in FIG. 3B, the check valve would be open when the engine is running. The fuel pressure, generated by the operating engine, forces the inner cylindrical portion 30*b* to the left (with respect to FIG. 3B), unseating the O-ring 30*e* while allowing fuel to flow through the ports 30*d* to the filter mounted on the remote filter head 21. Note that spring 30*a* is compressed when the check valve is in the open position. The check valves 30 may be made of brass or steel.

Returning to FIG. 1, each of the fuel hoses 28 contains brass fittings 52 at either end for connection to the filter adapter 21 and the remote filter head hose connection 26. The remote filter head hose connection 26, which may be made of 6061 aluminum, is fastened to the remote filter head 21 using, for example, a socket head cap screw 27 threaded into recess 33 (see FIG. 4 also), or other equivalent means. Roll pin 31 interfaces with recess 31*a* in the remote filter head and recess 31*b* in hose connection 26 (see FIG. 5) to align and stabilize the remote filter head and the hose connection. O-rings 44 maintain the seal between the remote filter head 21 and the hose connection 26.

Figure 5:
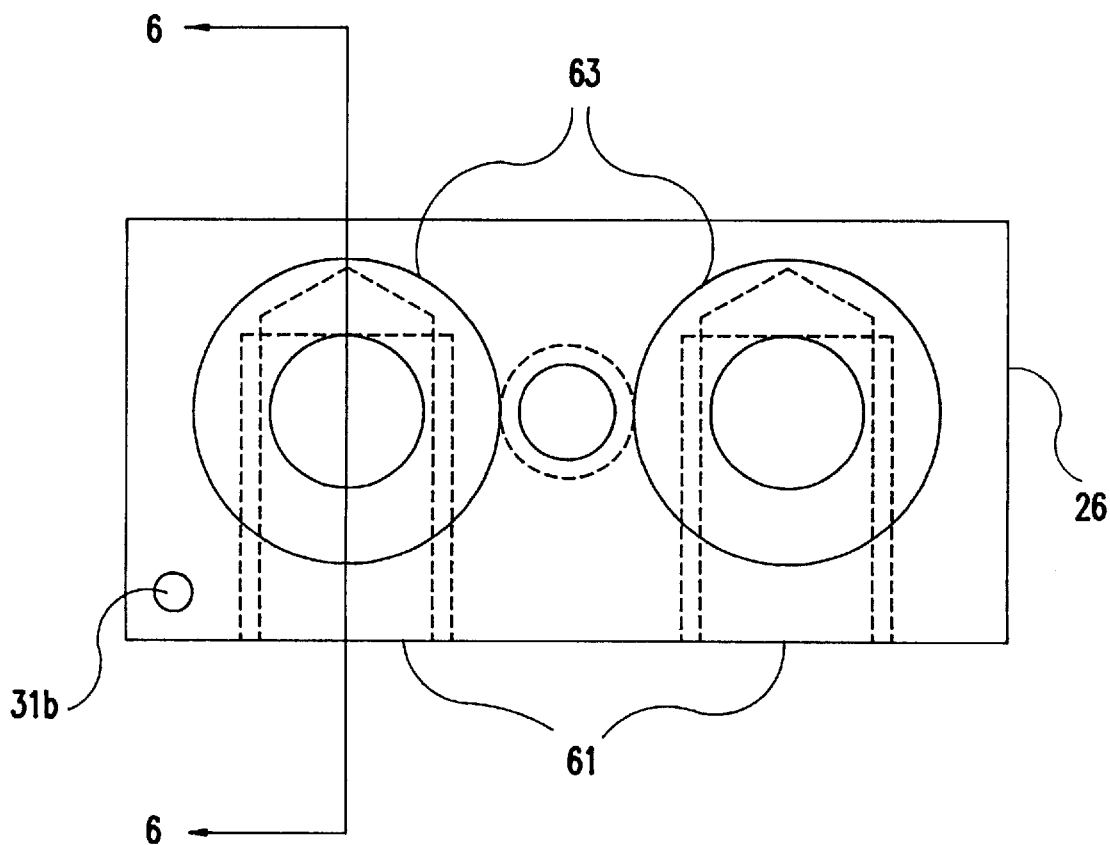
FIG. 5 is a side view of the hose connection bracket.
Figure 6:
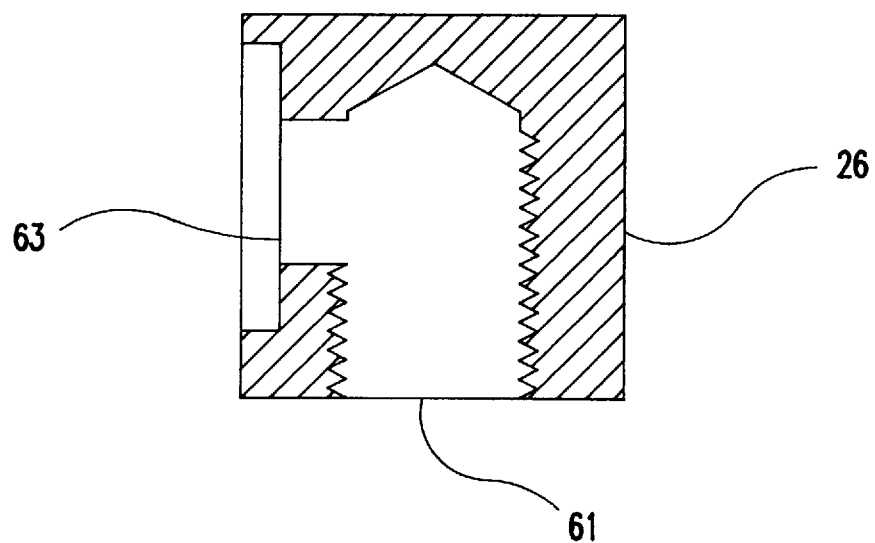
FIG. 6 is a cross sectional view of the hose connection bracket taken along the line 6—6 in FIG. 5.

FIG. 5 is a side view of the hose connection 26 showing recesses 63 that communicate with respective recesses 36 and 38 on the filter head 21. FIG. 6 is a cross sectional view of the remote filter head hose connection 26, taken along the line 6—6 of FIG. 5. The hose fitting 52 connected to hose 28 would be inserted in opening 61 and the check valve 30 would communicate with opening 63. One fuel hose 28 carries fuel from the engine fuel system to the remote filter head 21, while the other fuel hose 28 carries filtered fuel from the remote fuel filter head back to the engine. The hoses 28 may be typical automotive type ⅜" rubber fuel hoses, or stainless steel braided/teflon hoses, that could be cut to the desired length.

Figure 7B:
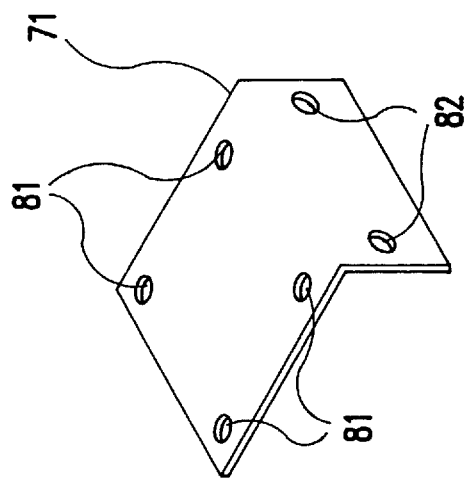
FIGS. 7A and 7B are perspective views of mounting brackets associated with the fuel filter kit of the present invention.
Figure 7A:
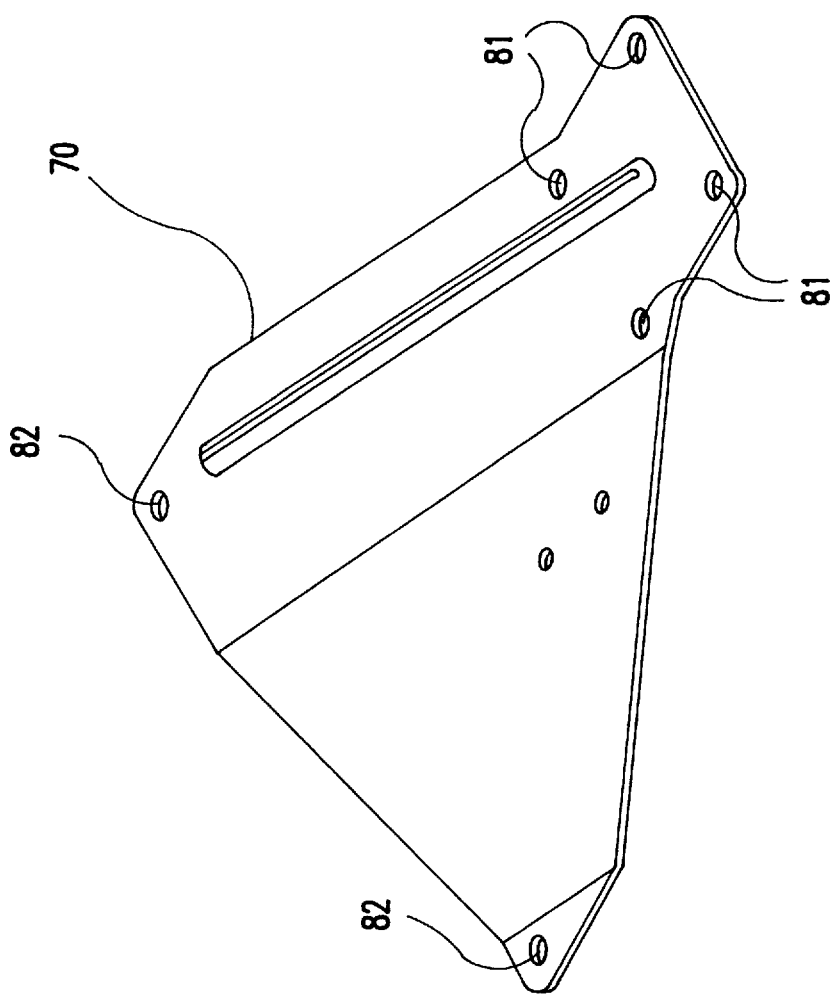

FIGS. 7A and 7B illustrate various mounting brackets 70 and 71 that allow the remote filter head 21 to be mounted to some part of the engine or vehicle external to the engine. The remote filter head 21 may be fastened to the bracket with screws, bolts, or other equivalent means. For example, the remote filter head 21 may be fasten to the brackets 70 or 71 through openings 81 and recesses 80 (see FIG. 1) using four cap screws. The brackets 70 or 71 are fastened to an easily assessable part of the engine or vehicle through recesses 82.

FIG. 7A illustrates a unique triangular-shaped bracket 70 that may be used for a Dodge pick-up truck having a Cummins 3.9 L or 5.9 L (B-series) or 8.3 L (C-series) diesel engine. The shape of the bracket 70 allows the remote filter head to be mounted at the intake manifold in the Dodge pick-up truck, for example. It is understood, however, that different vehicles may require different mounting brackets and such different brackets are contemplated within the scope of the present invention. FIG. 7B, for example, illustrates a "universal" L-shaped bracket that may be used in for mounting the remote filter head 21. The brackets may be composed of 11 gauge steel, or other equivalent materials.

The remote mount fuel filter kit is designed to be installed quickly and easily by a person with average mechanical ability and with basic hand tools. Installation time would be about one-hour or less, depending on the ability of the installer and the particular installation location.

There are many benefits and advantages of the present invention. The assessable remote filter location allows for less complicated and faster filter changes, thereby saving maintenance costs. Also, the driver or owner of the vehicle could easily change the filter along the road if filter freeze-up occurs. This also saves on maintenance costs and downtime associated with returning the vehicle to service.

The filtered fuel is introduced into the engine in the location as originally designed by the engine manufacturer; only the physical location of the filter has been changed. Moreover, there is no need to purchase an additional unique fuel filter as the OEM filter is retained for use in the assembly of the present invention. The prime maintaining check valves prevent fuel drain-back and the need for professional service.

While the invention has been described in terms of the embodiments described above, those skilled in the art will recognize that the invention can be practiced with modification within the spirit and scope of the appended claims.

Having thus described my invention, what we claim as new and desire to secure by Letters Patent is as follows:

1. A fuel filter assembly for remotely mounting a fuel filter to a fuel system of an internal combustion engine of a vehicle, said fuel filter assembly comprising:

a fuel filter including a fuel inlet and a fuel outlet at an upper end thereof, a remote filter head including an upper surface, a lower surface, and a vertical mounting surface extending between said upper and lower surfaces, wherein said lower surface includes means for mounting said fuel filter thereto, an inlet channel extending from said mounting surface to the lower planar surface for connection to the fuel inlet of said fuel filter, an outlet channel extending from said mounting surface to the lower planar surface for connection to the outlet of the fuel filter, wherein said inlet channel includes a recess opening to said mounting surface;

a unitary connection block including a vertical mounting face and a horizontal lower face, an inlet passage extending from the lower face to said mounting face, an outlet passage extending from said lower face to said mounting face, wherein said inlet channel includes a recess opening to said mounting face;

means for mounting the mounting face of said connection block to the mounting surface of said filter head such that the recess of the inlet channel of the filter head aligns with the recess of the inlet passage of the connection block and the outlet channel of the filter head aligns with the outlet passage of the connection block; and first check valve means disposed within a cavity formed by the aligned recesses of the inlet channel of the filter head and the inlet passage of said connection block for permitting flow in a direction toward the the inlet of the fuel filter while blocking flow in a direction away from the inlet of the fuel filter.

2. The fuel filter assembly of claim 1, wherein the outlet channel of said filter head includes a recess opening to said mounting surface, wherein said outlet passage of said connection block includes a recess opening to said mounting face second, and second check valve means disposed within a cavity formed by the aligned recesses of the outlet channel of said filter head and the outlet passage of said connection block for permitting flow in a direction away from the outlet of the fuel filter while blocking flow in a direction toward the outlet of the fuel filter.

3. The fuel filter assembly of claim 1, further comprising a mounting bracket, wherein said mounting bracket contains a first plurality of openings for receiving an attaching means for affixing said mounting bracket to the engine or vehicle and a second plurality of openings for receiving another attaching means for affixing the upper surface of said remote filter head to said mounting bracket.

4. The fuel filter assembly of claim 3, wherein said mounting bracket is of substantially triangular shape, said first plurality of openings being respectively located at first and second corners of the triangular-shaped bracket, and said second plurality of openings being located at a third corner of the triangular-shaped bracket.

5. The fuel filter assembly of claim 3, wherein said mounting bracket is of substantially L-shape, said first plurality of openings being located at a first leg of said L-shaped bracket and said second plurality of openings being located at a second leg of said L-shaped bracket.

6. The fuel filter of claim of claim 1, further comprising an inlet hose and an outlet hose, a first hose connection means for connecting a first end of said inlet hose to the inlet passage at the lower face of said connection block, and a second hose connection means for connecting a first end of the outlet hose to outlet passage at the lower face of said connection block.

7. The fuel filter of claim 6, further comprising a remote filter adapter for installation on the engine at a location where a fuel filter was installed, third hose connection means for connecting a second end of said inlet hose to an outlet of the filter adapter, and fourth hose connection means for connecting a second end of said outlet hose to an inlet of the filter adapter.

\* \* \* \* \*